Feb. 23, 1971    W. A. GRAF, JR    3,565,587
LIQUID SEALED GAS TIGHT DISSOLVER WITH VIBRATING TRAY MEANS
Filed Oct. 31, 1966    2 Sheets-Sheet 2
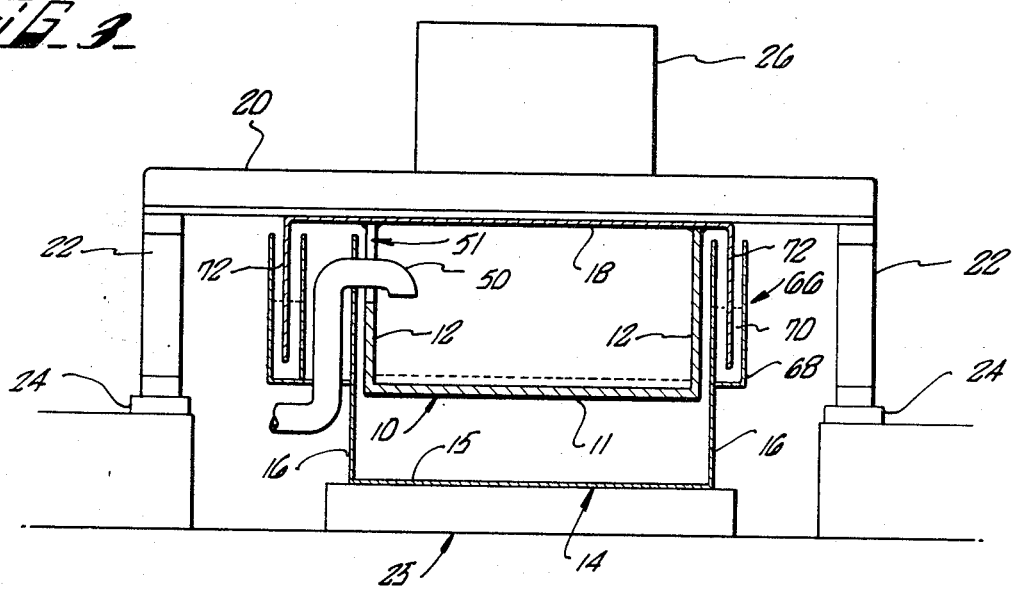
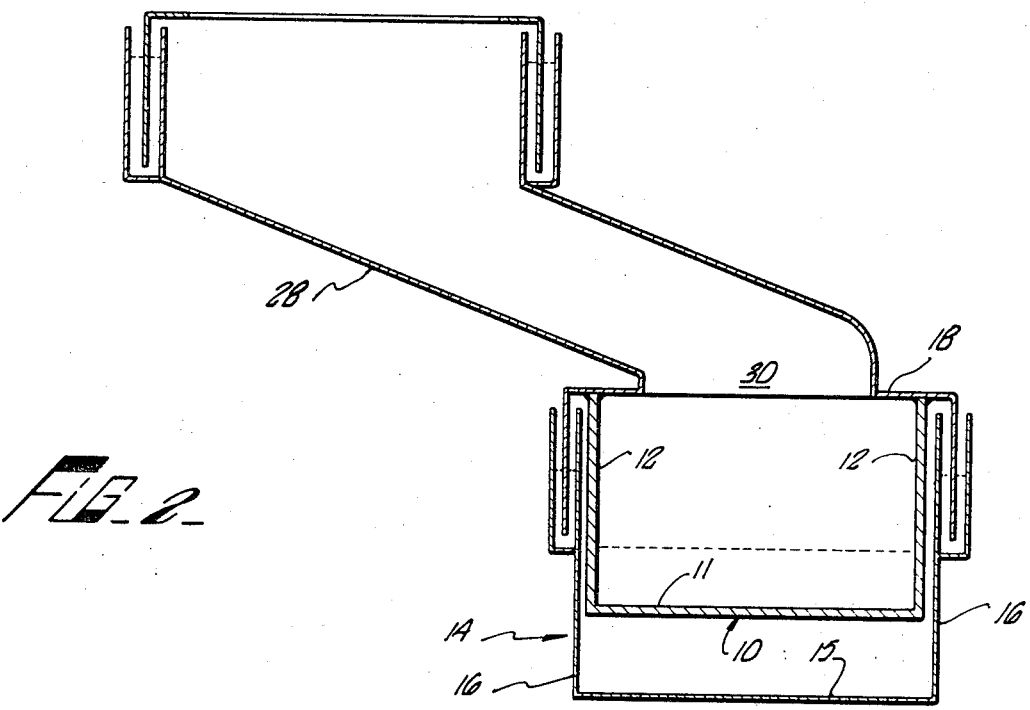
INVENTOR.
WALTER A. GRAF, JR.
BY
Christie, Parker & Hale
ATTORNEYS.

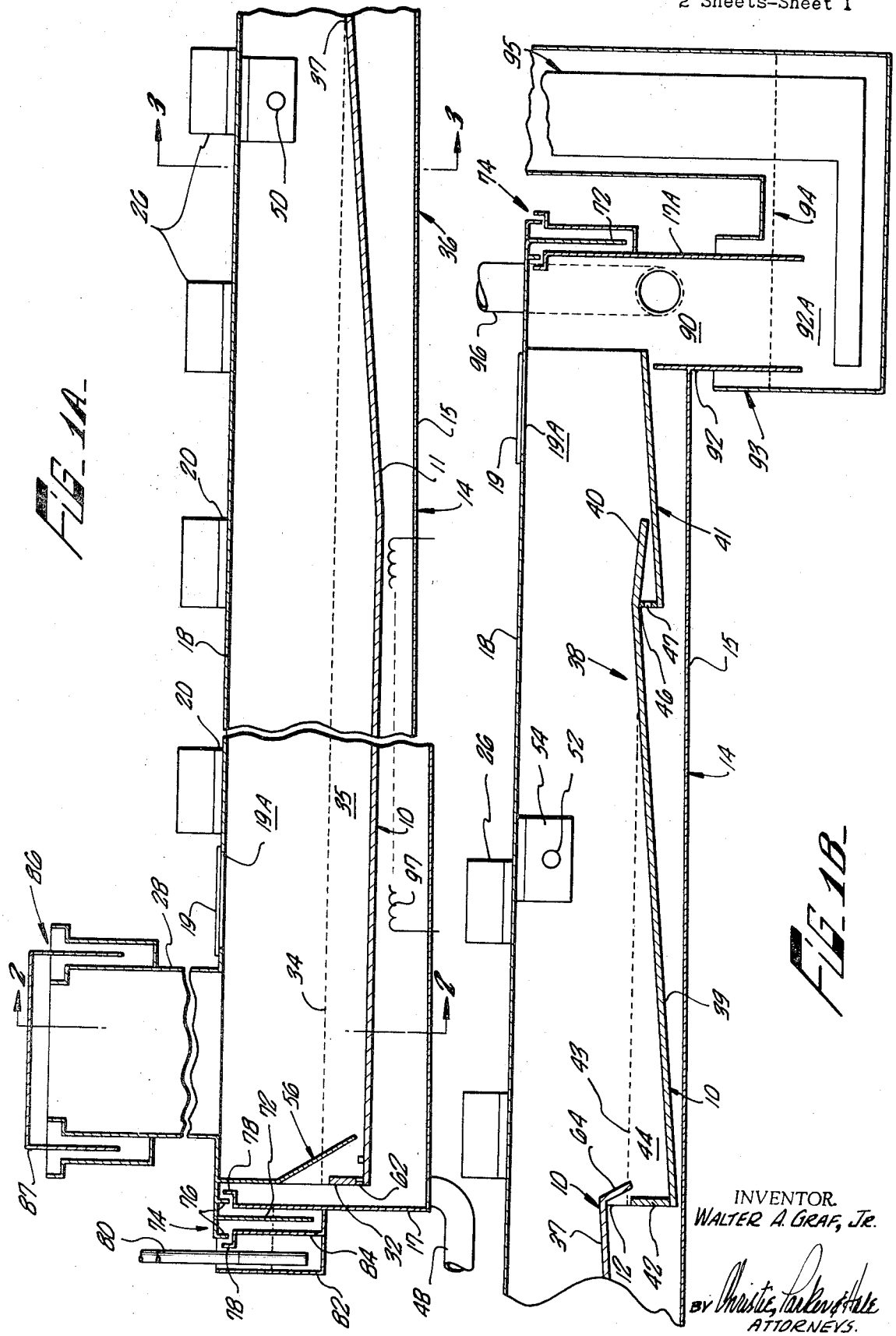

United States Patent Office 3,565,587
Patented Feb. 23, 1971

3,565,587
LIQUID SEALED GAS TIGHT DISSOLVER WITH VIBRATING TRAY MEANS
Walter A. Graf, Jr., Saratoga, Calif., assignor to General Electric Company, New York, N.Y., a corporation of New York
Filed Oct. 31, 1966, Ser. No. 590,936
Int. Cl. B01d 11/00
U.S. Cl. 23—267           8 Claims

ABSTRACT OF THE DISCLOSURE

A leacher-conveyor which continuously moves solid material through a bath which dissolves soluble portions of the solid material is disclosed. The leacher-conveyor includes at least one inclined tray partially immersed in the bath within a tank. The tray is vibrated to agitate the solid material and gradually move it from a receiving section to a discharge system. A tank cover secured to the tray is included. A gas tight seal is provided between the cover and the tank, to prevent the emission of possibly toxic gases or vapor. This seal permits slight relative movement between the cover-tray assembly and the tank, so that the cover and tray may be vibrated as a unit by vibrating means mounted on the cover.

---

This invention relates to apparatus for conveying solid material through a liquid bath for the purpose of dissolving or leaching a portion of the material and discharging the undissolved material separately from the dissolved material. The invention can be used for treating different types of solid materials in liquid baths but is particularly well suited for leaching or dissolving radioactive nuclear fuel from fuel rod segments, and it is described with reference to such use.

In a typical nuclear reactor, uranium oxide or other fissionable core material is disposed in long tubes of corrosion-resistant cladding material such as stainless steel or an alloy of zirconium. This material is arranged in proper geometry with the necessary controls, moderators, reflectors, etc. to permit operation of a controlled nuclear reaction producing heat. This heat is removed by a coolant which is used to transfer the energy to a turbine or other device for conversion to a useful energy form.

As the nuclear reaction proceeds, the quantity of fissionable material in the fuel decreases and the amount of fission fragment in the fuel increases until there is insufficient reactivity in the fuel to economically support the nuclear reaction. After the nuclear fuel in the rods is spent below a useful level, the rods are removed from the reactor and replaced by other rods containing fresh fuel. The spent fuel often contains a substantial amount of uranium and other material which should be recovered and separated from the fission fragments. To accomplish this recovery, the spent fuel must be first dissolved and prepared for subsequent chemical processing.

In accordance with this invention, the rods with spent nuclear fuel are cut into segments by shearing or the like and dropped into a tray containing a pool of liquid solvent such as nitric acid which dissolves the spent fuel but not the cladding. The segments are advanced through the acid bath at a controlled rate which leaches the spent fuel from the segments. At the end of the leaching process, the empty cladding is removed from the solvent bath, rinsed, drained, and removed from the process. The liquid containing the dissolved spent fuel is collected for additional processing.

Since part of the spent fuel which is being processed is fissionable, the geometry and operation of the apparatus used in treating it must avoid exceeding a critical mass at all periods of operation. An important hazard to avoid is the piling of segments into critical geometrical configuration during their transport through the apparatus. The apparatus of this invention avoids this problem by the unique selection of dimensions and geometry and by oscillating the transport tray to provide material movement. Oscillating the transport tray, in addition to providing the transporting motion for the segments, also provides the agitation for intimate contact of the cladding and spent fuel of each segment with the liquid for efficient leaching. The present invention also provides the necessary containment to prevent fumes and finely-divided solids from escaping into the atmosphere.

The transporting tray of the apparatus of the present invention supports and conveys the segments through a liquid solvent bath or pool. Means are provided for placing segments to be treated in one portion of the pool, and means are provided for vibrating the tray in a manner that agitates the segment in the liquid and moves the segments through the liquid. A portion of the transport tray is sloped such that after passing through the solvent bath the empty cladding segments are transported upward out of the liquid. After draining, the cladding segments drop into an acid or water rinse pool. The bottom of the rinse section is also sloped to transport the cladding segments up out of the solution for draining before discharge through a water seal for disposal by an elevator or conveyor.

Preferably, the apparatus is arranged so that a first pool is mounted in series with a second pool so that solid material can be advanced through the first pool and into the second. In leaching uranium oxide from fuel rod segments, the first pool holds a bath of acid, and the second pool holds a bath of rinse water or acid. The solid materials are advanced from the first pool up a ramp or the like so they have an opportunity to drain before entering the second pool. The solid material is also preferably advanced up a ramp in the second pool to permit draining before the solid material is removed from the apparatus.

The solvent is circulated into the first or leaching pool, preferably entering at the cladding segments discharge end of the first pool and overflowing at the solids segments feed end of the pool, thus providing countercurrent flow of solids and liquid.

These and other aspects of the invention will be more fully understood from the following description and the accompanying sketches, in which:

FIG. 1A is a longitudinal sectional elevation of the inlet end of the preferred embodiment of the leacher conveyor of this invention;

FIG. 1B is a continuation of FIG. 1A and is a longitudinal sectional elevation of the cladding outlet end of the preferred embodiment of this invention;

FIG. 2 is a view taken on line 2—2 of FIG. 1A; and

FIG. 3 is a view taken on line 3—3 of FIG. 1A.

Referring to FIGS. 1A, 1B, 2, and 3, an elongated rectangular tray 10 having a bottom 11 and vertical side walls 12 is disposed within and spaced from an elongated rectangular tank 14 which has bottom 15, vertical side walls 16, vertical ends 17 and 17A, and a horizontal lid or cover 18, which is secured to the top edges of the tray vertical side walls that extend slightly above the tank vertical side walls. A plurality of longitudinally-spaced access doors 19 are secured over respective inspection openings 19A in the cover.

The tray 10 is suspended from the cover 18 by the vertical sides 12 and the cover, in turn, is supported from a plurality of horizontal and transverse crossbars 20 secured to the top surface of the cover. These are supported at their ends by upright leaf springs 22 secured at their upper ends to the crossbars and at their lower end to floor pads 24. Other methods may be employed for supporting the horizontal cover 18, such as the use of coil springs, air cushions, combination of these or the like. The tray 10 and cover 18 assembly is vibrated as a unit to cause the solid fuel segments to advance along the tray from left to right (as viewed in FIGS. 1A and 1B). The tank 14 remains stationary and is mounted by conventional methods on a pad 25.

The vibratory motion is provided by conventional vibrator drive units 26 of mechanical, pneumatic, or magnetic types. The drive system shown preferably employs a plurality of low amplitude (less than ¼ inch) high frequency (3000 to 6000 cycles per minute) vibrator drive units 26 mounted directly on the cover and spaced as required to balance load requirements. These units are separable from the cover and designed to be replaced without disturbing the cover position. An alternate design makes use of a single high amplitude (about ½ inch), low frequency (200 to 600 cycles per minute) vibrator drive unit which would be mounted on the side, end, or base supporting the leacher-conveyor unit and attached such that the drive may be replaced without disturbing the cover unit.

The cover 18 is designed to vibrate freely and yet provide a vapor enclosure in cooperation with tank 14. A flange 72 extends outwardly and downwardly from the cover and terminates in a trough 68 which entirely surrounds the tank. The trough contains a liquid 70, such as water, to a depth that submerges the lower edge of cover flange 72 to form a seal 66 providing the closure on the system. Flanges 84 at the ends of the cover extend transverse to the direction of the vibration and are provided with splash baffles 74 to avoid excessive loss of seal liquid from the trough. As best seen in FIG. 1A, the splash baffle includes two downwardly-extending short vertical baffles 76 secured to the cover 18 on opposite sides of flange 84, and a pair of upright short baffles 78 secured to the trough outside of the baffle 76. Seal liquid supply and level detection is provided in a reservoir 82 (FIG. 1A) by means of pipe connections 80. The reservoir communicates with the trough through a slot opening 84 in the bottom of the trough. A similar liquid seal 86 is provided around the upper end of the chute where solids are dropped into the tray.

The transport tray 10 is flat under a leaching pool 35, followed by an upwardly-sloped ramp section 37 of such height that any solids moving through the unit will leave the liquid before passing into a rinse pool 44. The leaching pool 35 liquid level 34 is determined by a vertical weir 32 at the left (as viewed in FIG. 1A) end of the tray. Solvent enters the pool via a pipe connection 50, flows through the pool 35, and leaves the tray via the weir 32. A downwardly- and inwardly-extending baffle 56 at the left (as viewed in FIG. 1A) end of the tray prevents solids which tend to float on the solvent from flowing over the weir. The liquid leaving the tray is confined in the tank 14 and flows by gravity to an associated processing vessel (not shown) via a drain connection 48. Weep holes 62 are provided in the tray to permit the liquid drainage at such a rate as to not appreciably affect the liquid level during normal operation but will permit drainage of the pool when feed liquid ceases.

Spent fuel segments (not shown) enter the apparatus via a chute 28 and fall on tray 10 to be moved along the tray. A water seal system 86 maintains process containment around the feed chute and a chute cover 87.

A rinse section 38 of the leacher is designed with a sloping ramp bottom 39 and a vertical end 42 containing a rinse pool 44. The pool liquid level 43 is determined by the liquid flowing over weir 42 to the tank 14 and then combining with the solution in the leaching pool and draining via pipe connection 48. Separate routing of discharge rinse may be included by providing a tank separator and auxiliary drain. Rinse liquid enters the tray via a pipe connection 52. A downwardly-extending baffle 64 on the right end of the ramp section 37 extends down into the rinse pool and prevents solids from inadvertently leaving the rinse pool via the weir.

The ramp 39 extends above the rinse pool level 43 to permit drainage of liquid from the solids and reverses slope in a short section 40 to assure full drainage from the solids despite traps. A ramp 41 under section 40 lifts the solids over into a tank separator 92 to the discharge area 90 and provides for removal of the last bits of drainable liquid to the tank via holes 47 in a vertical wall 46 at the left end of ramp 41.

The solid drops into a pool 92A seal liquid, usually water, in a seal chamber 93 with a liquid level 94 such that the walls of the discharge section 90 are sealed to prevent escape of process vapors. Solids are then carried away by a cladding elevator 95 such as a conventional vibrating spiral elevator, or the like.

Process gases generated during the process leave the enclosure via a pipe connection 96 at the discharge end of the tank.

In a typical operation for treating irradiated nuclear fuel, the rods which are about ½ inch diameter and 12 to 14 feet long are cut into segments 2 to 3 inches long by a shear (not shown) and dropped through the inlet chute onto the transport tray of the leacher-conveyor at the left end of the first pool as shown in FIG. 1A. The vibrating drive units oscillate the transport tray assembly, moving the cut fuel segments along the tray at a controlled rate through the liquid. Simultaneously, a solvent in the form of nitric acid is circulated through the pool to dissolve the spent fuel core leaving the cladding. Either one of two methods is used for the circulating acid system. One feeds the acid of specific gravity about 1.2 at a rate such that the liquid flows countercurrently to the solid and discharges by spilling over the weir at specific gravity of about 1.5 containing the dissolved core material. The second operating method uses a storage tank (not shown) in conjunction with the leacher-conveyor to contain the required acid at 1.2 specific gravity which is recirculated at any desired rate until the entire batch of acid reaches the final 1.5 specific gravity.

Heat is added to the system to increase dissolution rate by an electric or steam heat coil 97 in the tank, or by heating the solvent before introducing it into the tray.

The solution is held for further processing and the cladding is advanced from left to right as seen in FIGS. 1A and 1B, up the ramp of the first pool and into the rinse pool as the major part of the solvent liquid drains from the cladding back into the first pool. The cladding continues to advance up the ramp of the rinse pool while a rinse liquid such as acid at specific gravity 1.2 is added to the pool and overflows the weir 42 to combine with the solution overflowing from the first pool and draining to an associated vessel (not shown).

The cladding is permitted to drain as it ascends the ramp and further drainage is promoted by the reversed slope of the ramp 40 before the cladding segments drop into the discharge chamber and into the water sealed outlet 93. The cladding is then lifted from the water seal by the cladding elevator unit similar to a vibratory spiral elevator type conveyor.

Off-gas from the chemical reactions taking place in the apparatus is carried from the enclosure to an off-gas system (not shown) for treatment before disposal.

A typical leach cycle of the leacher-conveyor requires addition of some 175 pounds of spent fuel into the tray in a 10 or 15 minute period once each hour; therefore, the vibrator action of the leacher need not be continuous for material advancement but may be continuous at a low rate, if desired, for agitation. The average residence time for individual segments in solvent is approximately 4 hours. However, time cycles may be altered as required for treatment of feed varying in specific properties. It is significant with respect to the design of the system that the weight of the individual fuel segments is reduced to approximately ¹⁄₁₀ of its original weight on passing through the leacher-conveyor.

As will be appreciated from the foregoing description, this invention provides leaching apparatus which can handle radioactive material safely. The material being dissolved is vibrated through the unit so there is little chance of jamming. The solvent is disposed over an elongated tray which further reduces the potential for accidental accumulation of a critical configuration. The fumes and off-gases from the reaction are contained within the apparatus so as to be directed to the proper treatment facilities. In addition, the drive units are located on the top or beside the apparatus where they can be easily reached for remote replacement without disturbing the remainder of the system.

I claim:

1. Liquid sealed gas tight apparatus for dissolving soluble portions of solid materials comprising:
    (a) a liquid sealed gas tight tank adapted to hold a pool of liquid;
    (b) at least one tray within said tank including an inclined portion extending from a solid material receiving section below the surface of a liquid pool within said tank to a solid material discharge section above the surface of said liquid pool;
    (c) a liquid sealed gas tight cover means over said tank secured to said tray, said tray being secured to and supported by said cover means;
    (d) gas tight liquid seal means between said cover and said tank permitting substantially unimpeded slight relative movement between said tank and said tray;
    (e) means for placing solid material on said receiving section of said tray;
    (f) means for vibrating said cover thereby to vibrate said tray to agitate said solid material and move said solid material along said tray through said liquid to said discharge section above the surface of said liquid; and
    (g) means for removing said solid material from said discharge section of said tray.

2. Apparatus according to claim 1 further including means for adding liquid to the pool at a first point adjacent said discharge section of said tray and means for removing liquid from said pool at a point adjacent said receiving section of said tray.

3. Apparatus according to claim 1 wherein said at least one tray further includes a reverse slope portion at said discharge section to aid in draining liquid from said solid material immediately before removal of the material from said tray.

4. Apparatus according to claim 1 in which said means for vibrating includes a mechanical vibrator attached to the outside surface of said cover.

5. Apparatus according to claim 4 wherein said mechanical vibrator is adapted to vibrate said cover and tray together at a frequency of from about 3000 to about 6000 cycles per minute over an amplitude of up to about one-quarter inch.

6. Liquid sealed gas tight apparatus for dissolving soluble portions of solid materials comprising:
    (a) a liquid sealed gas tight tank adapted to hold a pool of liquid;
    (b) within said tank a plurality of trays each of which includes an inclined portion extending from a receiving section below the surface of a liquid pool within said tank to a discharge section above the surface of said liquid pool; said trays arranged in series whereby solid material discharged from the discharge section of a first tray passes to the receiving section of the next tray;
    (c) liquid sealed gas tight cover means over said tank secured to said trays, said trays being secured to and supported by said cover means;
    (d) gas tight liquid seal means between said cover and said tank permitting substantially unimpeded slight relative movement between said tank and said trays;
    (e) means for placing solid material on said receiving section of the first tray;
    (f) means receiving solid material discharged by the discharge section of the last tray; and
    (g) means for vibrating said cover to thereby vibrate said trays to agitate said solid material and to move said solid material along said trays through said liquid to said discharge sections above the surface of said liquid;
    (h) means to add liquid to said pool at a point adjacent the discharge section of the last tray and means to remove liquid from said pool at a point adjacent the receiving section of said first tray whereby said liquid flows counter-current to the direction of movement of said solid material.

7. Apparatus according to claim 6 wherein there is a reverse slope portion adjacent the discharge end of each tray to aid in draining of liquid from the solid material as it is discharged by one tray to the receiving section of the next tray.

8. The apparatus according to claim 6 wherein said means for vibrating includes a plurality of mechanical vibrating means coupled to the outside of said cover adapted to vibrate said cover and trays at a frequency of from about 3000 to about 6000 cycles per minute through an amplitude of up to about one-quarter inch.

References Cited

UNITED STATES PATENTS

| | | | |
|---|---|---|---|
| 836,553 | 11/1906 | Bauer | 209—479 |
| 1,517,689 | 12/1924 | Welch | 23—270 |
| 2,227,605 | 1/1941 | Swallen | 23—270 |
| 2,538,285 | 1/1951 | Swayze | 209—479X |
| 3,083,126 | 3/1963 | Griffiths | 23—270X |
| 3,222,221 | 12/1965 | Branson | 134—25X |
| 3,227,263 | 1/1966 | Kastenbein | 198—220X |
| 3,242,933 | 3/1966 | Huff | 134—25X |
| 3,279,890 | 10/1966 | Szasz | 23—270 |
| 3,382,046 | 5/1968 | Faugeras | 23—270X |

FOREIGN PATENTS

| | | | |
|---|---|---|---|
| 924,475 | 3/1947 | France | 23—267 |
| 1,302,591 | 7/1962 | France | 209—479 |

WILBUR L. BASCOMB, JR., Primary Examiner

S. J. EMERY, Assistant Examiner

U.S. Cl. X.R.

23—270, 312, 342; 134—61, 66; 198—14, 60